United States Patent [19]

Arnold et al.

[11] Patent Number: 4,841,627

[45] Date of Patent: Jun. 27, 1989

[54] APPARATUS FOR MAKING TUBULAR CAMSHAFT ASSEMBLIES

[75] Inventors: Philip D. Arnold, Bloomfield Hills; Roy G. Kaywood, Stockbridge, both of Mich.

[73] Assignee: General Motors Corporation, Detroit, Mich.

[21] Appl. No.: 211,505

[22] Filed: Jun. 24, 1988

Related U.S. Application Data

[62] Division of Ser. No. 23,320, Mar. 9, 1987, abandoned.

[51] Int. Cl.$^4$ .............................................. B23Q 15/26
[52] U.S. Cl. ........................................ 29/720; 29/252; 29/256; 29/283.5
[58] Field of Search .............. 29/433, 445, 467, 522.1, 29/523, 33 T, 281.1, 283.5, 241, 252, 256, 720; 72/61, 62, 393, 367, 370, 75

[56] References Cited

U.S. PATENT DOCUMENTS

| | | | |
|---|---|---|---|
| 3,869,938 | 3/1975 | Schlotterbeck et al. | 74/567 |
| 3,999,277 | 12/1976 | Hamada | 29/447 |
| 4,265,388 | 5/1981 | Takahashi et al. | 29/525 X |
| 4,293,995 | 10/1981 | Jordan | 29/421 R |
| 4,382,390 | 5/1983 | Jordan | 74/567 |
| 4,575,913 | 3/1986 | Sugiuchi et al. | 29/432 |
| 4,597,365 | 7/1986 | Madaffer | 29/467 X |
| 4,620,454 | 11/1986 | Sugiuchi et al. | 74/567 |
| 4,693,138 | 9/1987 | Hughes et al. | 74/567 |
| 4,730,474 | 3/1988 | Iwakura et al. | 72/61 |

FOREIGN PATENT DOCUMENTS

| | | |
|---|---|---|
| 230731 | 8/1987 | European Pat. Off. |
| 408875 | 1/1925 | Fed. Rep. of Germany. |
| 2336241 | 2/1975 | Fed. Rep. of Germany. |
| 3303629 | 9/1983 | Fed. Rep. of Germany. |
| 3401057 | 7/1984 | Fed. Rep. of Germany. |
| 3521206 | 12/1986 | Fed. Rep. of Germany. |
| 552028 | 1/1923 | France. |
| 46-21299 | 6/1971 | Japan. |
| 57-149655 | 9/1982 | Japan. |
| 729989 | 5/1955 | United Kingdom. |
| 1117816 | 6/1968 | United Kingdom. |
| 2050207 | 1/1981 | United Kingdom. |

OTHER PUBLICATIONS

Shaw, F. W., "Dwell Cams of Uniform Diameter", Mechanical World, Oct. 4, 1935 pp. 329-330.
Sandford James, "Nonround Connections Strength Mechanical Drives", Reprint from Design News, Sep. 22, 1975 (2 pages).

Primary Examiner—Howard N. Goldberg
Assistant Examiner—Andrew E. Rawlins
Attorney, Agent, or Firm—Robert J. Wallace

[57] ABSTRACT

Camshaft assemblies, methods and apparatus are provided for making camshafts by the expansion of tubular shafts into prelocated cams, journals and other elements, if desired. Features of the camshafts include trilobe or polylobe element openings, preferably splined or serrated for low energy filling and high torque capacity and high strength low alloy mild steel tubular shaft material. The method emphasizes trapping, or loading, the shaft to prevent axial lengthening during expansion such as by mechanical ballizing. The apparatus includes adjustable thrust blocks and locating plungers with incorporated flush pin gages together with hydraulic or other loading means all for use in carrying out the assembly method with various benefits from the incorporated features.

18 Claims, 5 Drawing Sheets

APPARATUS FOR MAKING TUBULAR CAMSHAFT ASSEMBLIES

This is a division of application Ser. No. 23,320 filed on Mar. 9, 1987, now abandoned.

TECHNICAL FIELD

This invention relates to camshafts for internal combustion engines and the like. In particular, the invention relates to assembled camshafts and to methods and apparatus for their manufacture.

BACKGROUND

U.S. Pat. No. 4,597,365, issued July 1, 1986 to the assignee of the present invention, discloses a camshaft assembly and method involving retention of cam and journal elements on a hollow shaft by expansion of the shaft into engagment with preshaped openings of the elements. Various other camshaft assemblies and methods are also shown by the prior art. While certain of these arrangements provide benefits in economy and structure, further economies are desirable for making the most efficient use of this technology.

SUMMARY OF THE INVENTION

The present invention provides improved camshaft assemblies, manufacturing procedures and equipment which yield benefits in both structural soundness and economy of manufacture for assembled camshafts, particularly of the type described in the noted U.S. Pat. No. 4,597,365, the disclosure of which is incorporated herein by reference.

An improved camshaft according to the invention includes the use of nonround element openings comprising so called curved polygons of preferably uniform diameter and having odd numbers of slightly eccentric lobes. These configurations minimize the energy required for their filling by expansion of the associated hollow shaft while providing a joint of high torque capacity. The addition of one or more small grooves or splines on the ends of the lobes further improves the torque capacity. By use of preferred materials for the shaft, the torsional strength relative to the expansion energy required may be further improved.

In the manufacturing process, control of the length and straightness of the assembly and the ease of its removal from the assembly fixture are aided by the added step of loading the hollow shaft from the initially expanded (front) end during the mechanical expansion procedure so as to prevent its lengthening and locking itself in the fixture.

In the assembly apparatus, the use of adjustable locator blocks and spring loaded guide pin plungers assists in accurately locating the cam elements in their proper angular positions on the shaft prior to their being locked in position by shaft expansion. In addition, the guide pins may have stepped heads cooperating with external gaging surfaces of the fixture to permit visual or mechanical indication of proper or improper positioning of the cams and their presence in the fixture during assembly.

These and other features and advantages of the invention will be more fully understood from the following description of certain embodiments of the invention taken together with the accompanying drawings.

BRIEF DRAWING DESCRIPTION

DETAILED DESCRIPTION

Figure 1:
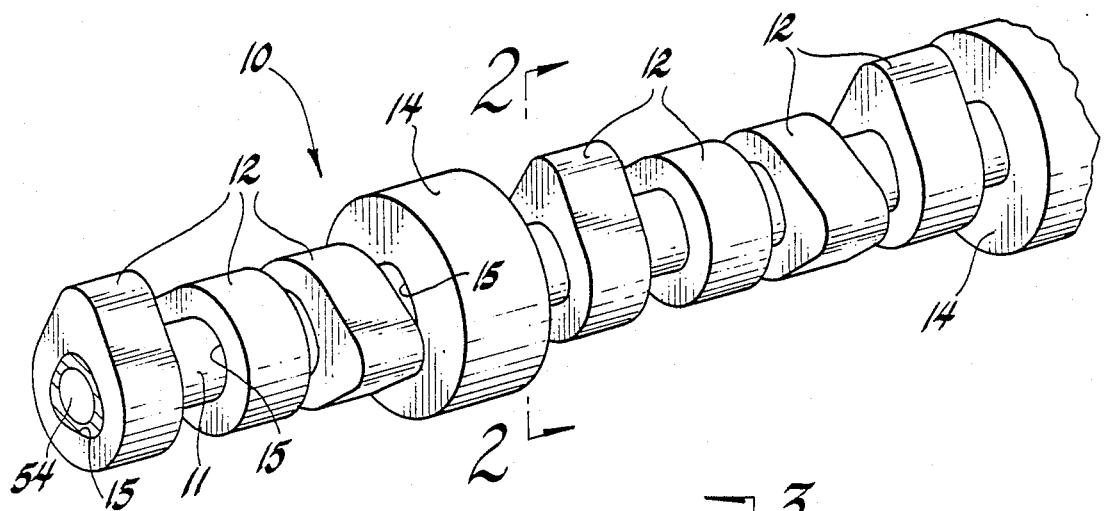
FIG. 1 is a pictorial view of a portion of an internal combustion engine camshaft assembly formed in accordance with the invention.

Referring now to the drawings in detail, numeral 10 generally indicates part of a finished camshaft assembly formed in accordance with the invention. Camshaft 10 includes a hollow supporting tube or shaft 11 which which has been expanded in a manner to be subsequently described.

While the shaft may be made of ordinary low carbon steel as noted in U.S. Pat. No. 4,597,365, we prefer to make the shaft 11 of a mild steel of High Strength Low Allow specification such as SAE 1022 HSLA. The steel tubing used to make the shaft may be of a type which is electric resistance welded and drawn over a mandrel, having a yield strength of 45,000–55,000 psi.

Fixedly positioned on the tube 11 are a plurality of cam elements 12 and journal elements 14. Additional elements such as gears, eccentrics or sprockets could also be included if desired. The elements 12, 14 are longitudinally spaced and the cam elements 12 are angularly oriented in predetermined positions for actuating valve gear in an internal combustion engine or the like. The cam elements 12 are preferably forged and hardened, either fully or on their wearing surfaces, and the journal elements 14 may be similarly formed or, if desired and their operation permits, may be formed of non-hardened material.

The forged, or otherwise formed, cam and journal elements are provided with tube or shaft receiving openings 15, which are preferably non-circular to positively lock onto the shaft when it is expanded into the openings. We have found that a preferred shape or configuration for the openings is that of a so-called curved polygon of preferably uniform, or essentially uniform, diameter. Such curved polygons may be made with any odd number of lobes, however we prefer to use and have obtained good results using a configuration, which we call a trilobe, having three eccentric lobes 16.

Minimal eccentricity is required and preferred for high torque capacity with a minimum of expansion energy. An eccentricity of only five thousandths of an inch (0.005 in. difference in radial height between the lobes and adjacent valleys) gives good results although greater eccentricities can be used if desired.

Figure 4:
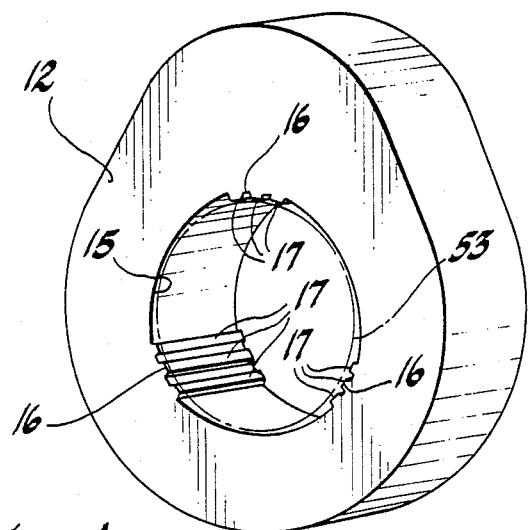
FIG. 4 is a pictorial view of a separate cam element prior to assembly and having a trilobe opening according to the invention with inwardly splined lobes.

To further increase the torque capacity, the addition of one or more small serrations or splines 17, preferably at the ends of the lobes, is also desirable. We have found effective the addition of nine inwardly protruding and longitudinally extending splines 17. These splines are preferably arranged in closely spaced groups of three at the end of each of the lobes 16 of the openings 15. The splines protrude inwardly only about 0.005 inches, or approximately equal to the preferred trilobe eccentricity. The addition of these splines was found to increase the breakaway torque for the shaft mounted trilobe elements about 20-25 percent. FIG. 4 illustrates a cam element 12 prior to assembly and having the preferred nine splined trilobe opening previously described. Obviously, in this and the previous views, the eccentricity of the opening is grossly exaggerated for clarity of illustration as it would be almost unnoticeable if drawn in its true configuration.

Figure 5:
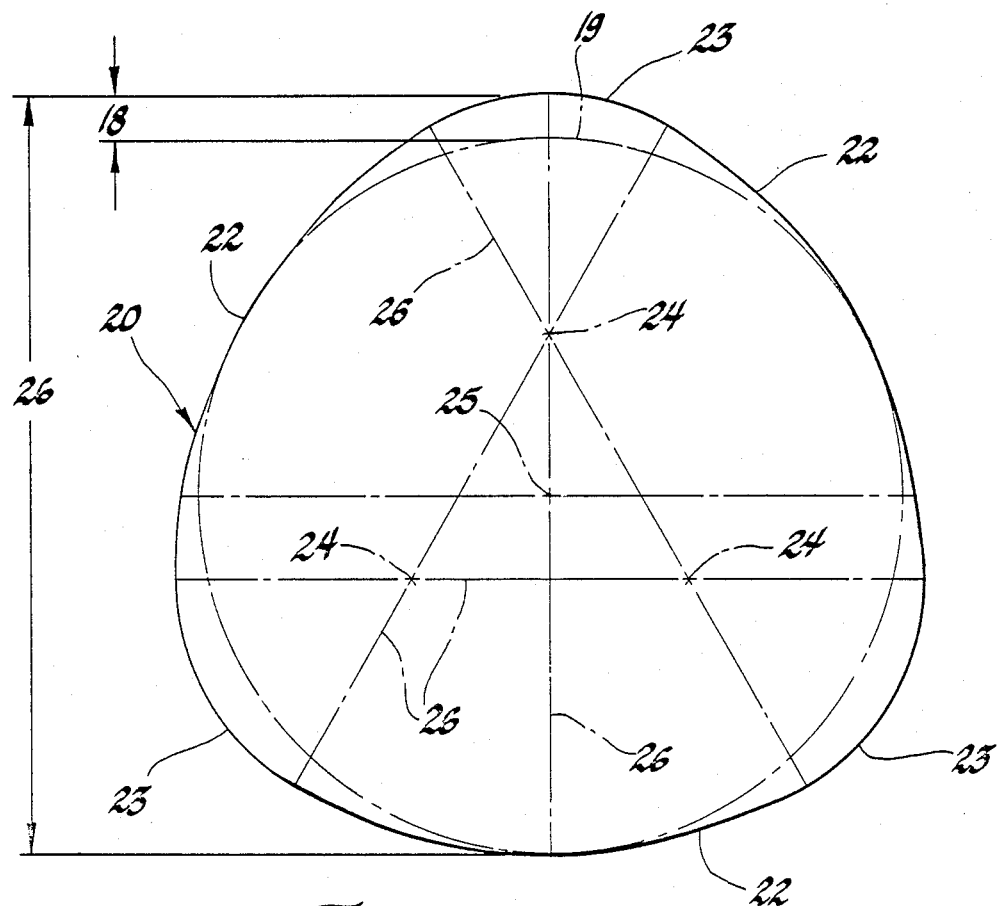
FIG. 5 is a graphical presentation of the development of a trilobe configuration having uniform diameters according to the invention.
Figure 6:
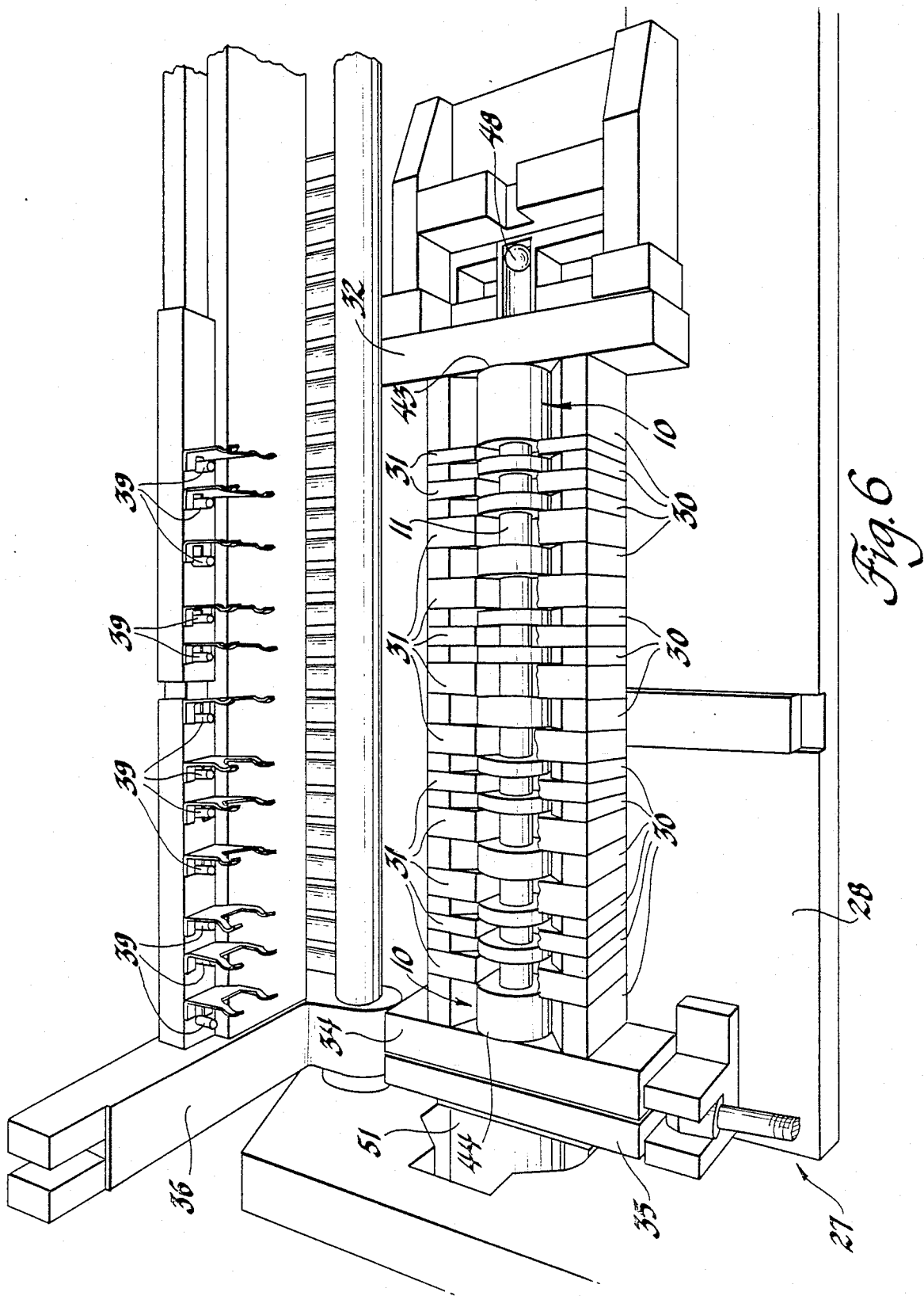
FIG. 6 is a pictorial view showing a novel assembly apparatus and fixture for assembling camshafts according to the invention.

In FIG. 5, a graphical illustration of the development of a trilobe figure is presented having an eccentricity 18 measured from a circle 19 defining the minimum radius of the trilobe perimeter 20. The developed perimeter 20 is made up of blended tangent swing radii in the form of a series of alternating long arcs 22 and short arcs 23 which are drawn from three equally spaced centers 24 spaced about the true center 25 of the figure. The result is that the perimeter has an overall uniform height or width 26 in any direction. For simplicity, this is generally referred to as a uniform diameter 26 although it should be understood that this uniform diameter dimension passes sequentially through each of the three centers 24 and only passes through the true center 25 when the diameter is at the midpoints of two opposing long and short arcs 22, 23.

Assembly Apparatus

Referring now to FIGS. 6-10 there are shown various construction features of a fixture generally indicated by numeral 27 and particularly adapted for the manufacture of camshafts according to the invention. Fixture 27 includes a base 28 on which are fixedly mounted a series of alternately disposed locators 30 and spacers 31 longitudinally aligned and sandwiched between a rear stop block 32 and a movable front backup block 34 adjacent to a fixed front carrier block 35. A movable cover 36 is also provided.

The spacers 31 separate the journals 14, cams 12 and other elements, if any, to maintain their proper axial locations. The locators 30 support the elements with their openings 15 in alignment and the lobes of the cam elements in their proper angularly indexed positions. Precision ground locator blocks 38 may be provided on each of the cam locators to angularly position their respective cams within any desired tolerances. The blocks 38 may be individually ground or shimmed for adjustment to obtain the desired accuracy. Other means, such as wedges or screws might be substituted for, or used together with, the locator blocks 38 if desired.

Figure 9:
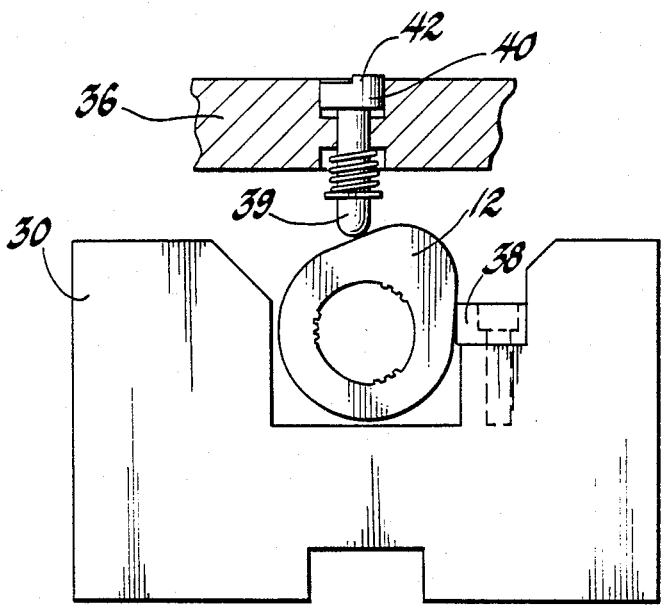
FIG. 9 is a transverse cross-sectional view from the plane indicated by the line 9—9 of FIG. 6.

To insure that each cam lobe is firmly held in its locator against its locator block 38, suitable positioning devices may be provided, such as the spring biased guide pins or plungers 39 best shown in FIG. 9. The plungers 39 may be mounted in the cover 36 as shown or, if needed, may be positioned along a side or the bottom in one of the locators to properly position their respective cams. The plungers 39 are provided with heads 40 having stepped ends 42 that cooperate with the adjacent outer surfaces of the cover or other member to act as flush pin gages. These gages may be inspected visually or by touch or may be contacted by probes at an inspection station, such as when used in a traveling fixture pallet in high volume manufacture.

Figure 10A:
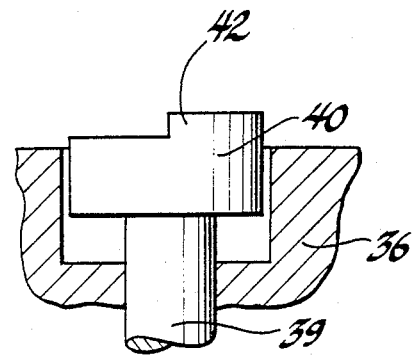
FIGS. 10a–10e are fragmentary cross-sectional views illustrating various positions of the flush pin gages.
Figure 10B:
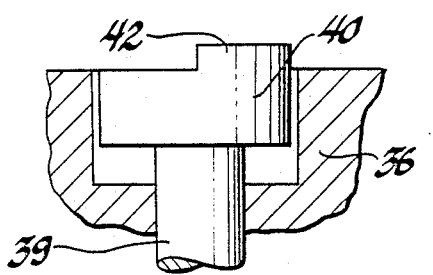
Figure 10C:
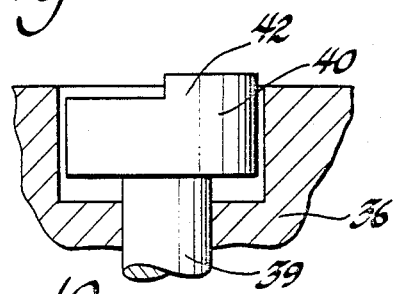
Figure 10D:
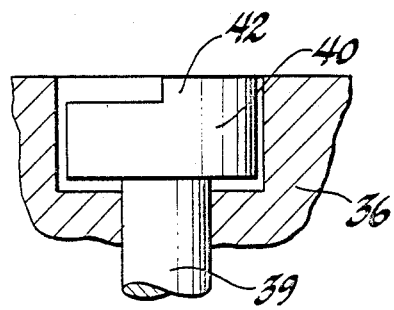
Figure 10E:
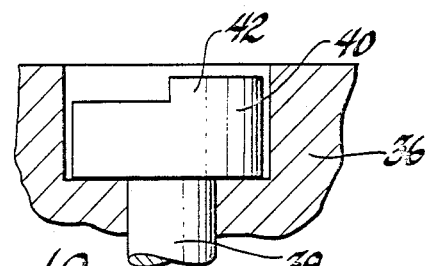

FIGS. 10a-10e illustrate various positions of the flush pin gages and their indications, such as:

FIG. 10a shows a gage positioned too high, indicating the presence of an element that is too large or a cam lobe not properly positioned against its locator;

FIG. 10b shows the lower step flush, indicating a cam or other element at the upper tolerance limit;

FIG. 10c shows the gage centered, indicating an element in the mid tolerance range;

FIG. 10d shows the upper step flush, indicating an element at the low tolerance limit; and FIG. 10e shows a gage position too low, indicating a too small or missing element.

Figure 7:
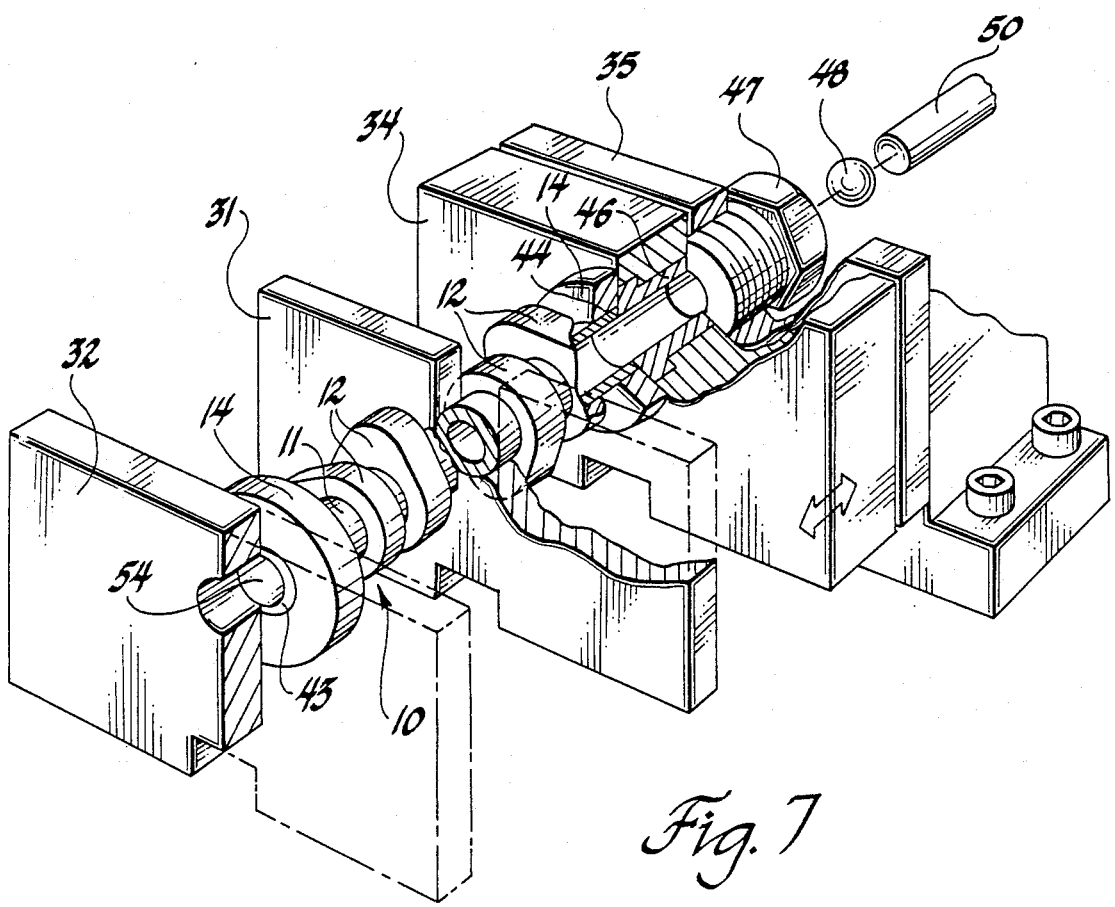
FIG. 7 is a diagramatic pictorial view of portions of the novel apparatus for mechanically loading the shaft during the course of camshaft assembly by a process in accordance with the invention.
Figure 8:
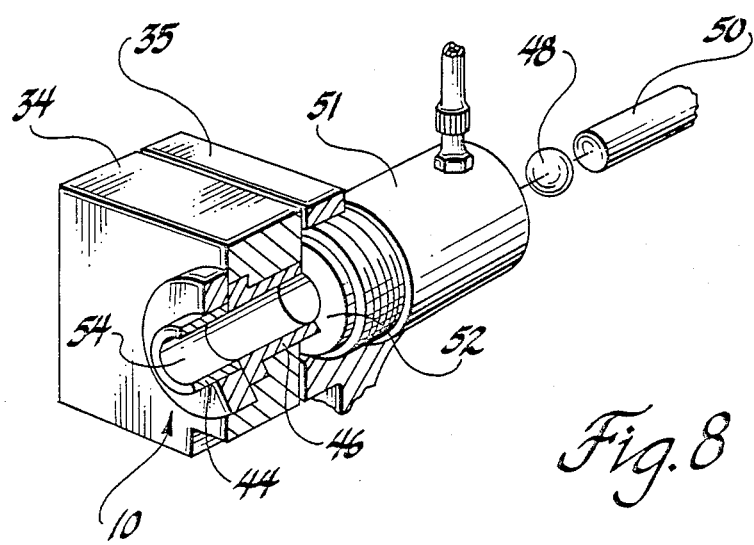
FIG. 8 is a pictorial view similar to a portion of FIG. 6 and showing an alternative apparatus for hydraulically loading the shaft.

FIGS. 7 and 8 show in further detail certain features of the assembly apparatus including alternative means for end loading the shaft during assembly.

FIG. 7 shows the rear end 43 of the shaft and the associated rear journal 14 lying against the rear stop block 32. Similarly, the front end 44 of the shaft and the associated front journal 14 are engaged by a hardened backup bushing 46 carried by the backup block 34. A hollow screw actuator 47, threaded into the carrier block 35 comprises mechanically actuated means for exerting force through the backup bushing on the front end 44 of the shaft 11 to load the shaft during assembly. Also shown are a ball 48 and cupped rod 50 actuated by suitable means, not shown, to force the ball through the shaft during assembly.

FIG. 8 illustrates a fixture whereby the front end 44 of the shaft 11 is similarly loaded through a backup bushing 46 carried by a backup block 34. However, the shaft loading means comprises a hydraulic cylinder 51 threaded into the carrier block 35 and having a hydraulically actuated hollow piston 52 that engages the backup bushing to apply the loading force to the shaft 11.

Assembly Method

The manufacture of a camshaft assembly in accordance with the invention is in many ways similar to that described in the noted U.S. Pat. No. 4,597,365, although including significant differences in the following preferred steps:

(1) The elements, such as cams and journals, a gear, eccentric and sprocket or the like, are made with, or provided with, the preformed shaft openings 15 and are formed to relatively close, but normally unfinished, dimensions. In accordance with the invention, the openings are preferably nonround curved polygons of minimal eccentricity, preferably trilobes having one or more inwardly projecting splines 17 at the lobe ends. Additionally, grooves or serrations extending outwardly from or into the trilobe surface, or other variations, may be used.

The trilobe or other odd lobed curved polygon shape requires lower energy for filling by tube expansion while giving high breakaway torques. Displacement of material from the valleys into the adjacent lobes with a minimum of expansion due to the preferred constant diameter, or height, of the polygon eccentric perimeter is believed to be an advantage of this configuration that leads to the lower energy requirement.

Figure 2:
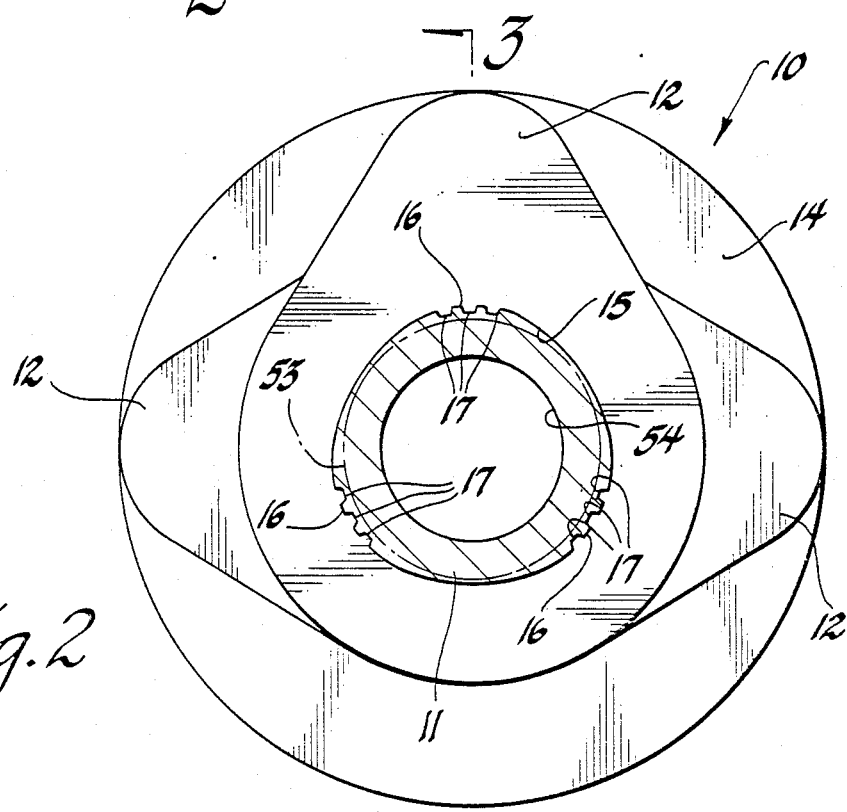
FIG. 2 is a transverse cross-sectional view of a portion of the camshaft assembly from the plane indicated by the line 2—2 of FIG. 1.

(2) A tubular shaft 11 is provided, preferably made of high strength low alloy mild steel such as SAE 1022 HSLA. The tube may be of the resistance welded type, sized by drawing over a mandrel and having a yield strength of 45,000–55,000 psi. This low yield strength combines with significant work hardening after yielding to provide low expansion energy with significantly higher breakaway torques after assembly than other materials. The shaft outer diameter is circular and sized to fit closely but freely within the eccentric shaft openings 15 of the elements 12, 14, etc. The dashed line 53 in FIGS. 2 and 4 represents the shaft outer diameter before expansion. Camshafts have been made with shafts of $\frac{3}{4}$, $\frac{7}{8}$ and 1 inch outer diameters but other sizes including larger and smaller diameters could be utilized if desired.

(3) The cam, journal and other elements, if any, are positioned in a fixture such as fixture 27 with their openings 15 aligned on a common axis. The fixture may be similar to, but preferably differs from, that described in the noted U.S. Pat. No. 4,597,365 in various ways, including the construction of the locators and spacers and the addition of the locating and gaging means and the shaft end loading means previously described.

(4) The fixture is closed, holding the elements in position and the shaft is inserted into the openings 15 in a predetermined longitudinal position. The shaft ends are then loaded by hydraulic, mechanical or other force applying means with a force sufficient to prevent substantial longitudinal growth of the shaft during the subsequent steps.

(5) The shaft is expanded in any suitable manner. We prefer mechanical expansion by a ball 48 forced through the tube or shaft 11 from one end, called the front end 44, to the other, called the rear end 43. With this process, sometimes known as ballizing, a uniformly sized smooth interior 54 is formed within the tube.

Figure 3:
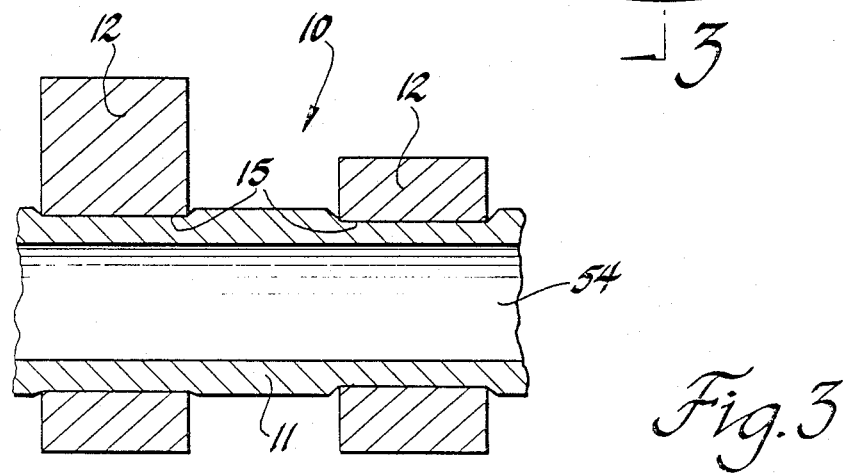
FIG. 3 is a longitudinal cross-sectional view of a portion of the camshaft assembly from the plane indicated by the line 3—3 of FIG. 2.

The ball is preferably large enough to expand the tube into full engagement with the element openings 15 and radially beyond the openings between the elements, as is shown clearly in FIG. 3, so that the elements are permanently fixed in their established positions, both angularly and longitudinally. In an embodiment wherein the initial clearance between the trilobe openings 15 and the shaft 11 before expansion was 0.008 inches on the diameter and the trilobe eccentricity was the preferred 0.005 inches, the use of a ball 48, oversize by 0.035 inches relative to the initial inner diameter of the shaft 11, provided the desired results with a minimum amount of expansion energy required relative to the high level of breakaway torque obtained for the assembled cam elements.

However, in some cases greater trilobe eccentricities may be desirable as, for example, when wide journal or cam elements are used and more volume for displacement of the expanded shaft material is required to avoid excessive longitudinal carryover of the displaced material. Trilobe openings with from 0.005 to 0.020 inch eccentricity have been tested but other dimensions could also be used as desired.

(6) After expansion of the shaft, the end loading of the shaft is released by backing off the force applying means. The assembled camshaft is then removed from the fixture for other finishing steps, if any, which may be required, such as hardening of the cams if they are not prehardened, grinding of the cams and journals, etc.

The force of the end loading of the shaft by the backup bushing 46 acting in opposition to the stop block 32 should be sufficient to prevent significant longitudinal growth of the shaft 11 during ballizing. This causes all the growth to be radial and provides the preferred complete filling of the trilobe openings 15 and the further expansion of the shaft material radially beyond the openings 15 in the spaces located longitudinally between the elements 12, 14, etc. In addition, the end loading prevents the elements from being locked against the spacers by lengthwise growth of the shaft during ballizing and, thus, after release of the end loading, allows easy removal of the assembled camshaft 10 from the fixture 27. Bending and other damage which might otherwise result from forced removal are thereby avoided.

Advantages

From the forgoing description of certain preferred embodiments of an improved camshaft assemblies, assembly apparatus and assembly methods it is seen that the various features of the invention provide numerous advantages including:

more accurate axial location of cam, journal and other elements on the shaft;

higher breakaway torques with minimal thrust energy for forcing the ball through the tubular shaft by reason of improved splined trilobe or other curved polygon shaped openings, improved shaft material selection, and end loading the shaft to prevent axial growth;

ease of removal from the fixture through prevention of axial growth;

better angular indexing by adjustable locators and locating plungers; and loaded fixture inspection with flush pin gages carried on the locating plungers.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. Apparatus for assembling a multipiece camshaft, said apparatus comprising
   locating means for holding a plurality of hollow cam and journal elements in predetermined fixed orientation and spacing with central openings aligned on a common axis,
   positioning means including a stop for axially locating one end of a hollow shaft extending through the openings of said elements,
   force applying means engageable with an opposite end of the hollow shaft and operable to load the shaft against the stop with a force adequate to prevent substantial axial growth of the shaft during subsequent expansion, and means for mechanically expanding the shaft into mechanical interference engagement with all the element openings to secure the elements permanently onto the shaft in said predetermined orientation and spacing.

2. Apparatus as in claim 1 wherein said locating means include locators recessed to receive and support the elements in desired lateral and angular orientations and spacers between the locators to longitudinally separate and locate the elements, the locators for the cam elements further including adjustable locator means in the recesses and engageable with the cam lobes to accurately adjust the desired angular location of the cam elements.

3. Apparatus as in claim 2 wherein said locating means further include biasing devices engageable with the cam elements to urge them against their respective adjustable locator means.

4. Apparatus as in claim 3 wherein the biasing devices comprise resiliently urged guide pins and said pins incorporate ends having stepped surfaces cooperating with adjacent surfaces of the apparatus to act as flush pin gages indicating the condition of elements loaded into the apparatus.

5. Apparatus as in claim 1 wherein the force applying means includes a hydraulic actuator for transmitting the applied force.

6. Apparatus as in claim 5 wherein the force applying means further includes a hardened hollow bushing engageable with said shaft opposite end and carried in a movable backup block for transmitting to the shaft forces applied by the hydraulic actuator.

7. Apparatus as in claim 1 wherein the force applying means includes a mechanical actuator for transmitting the applied force.

8. Apparatus as in claim 7 wherein the force applying means comprises a screw actuator.

9. Apparatus as in claim 8 wherein the force applying means further includes a hardened hollow bushing engageable with said shaft opposite end and carried in a movable backup block for transmitting to the shaft forces applied by the screw actuator.

10. Apparatus for making tubular shaft assemblies, said apparatus comprising
    locating means for holding a plurality of hollow elements in fixed orientation and spacing with central openings aligned on a common axis,
    positioning means including a stop for axially locating one end of a hollow shaft extending through the openings of said elements, force applying means engageable with an opposite end of the hollow shaft and operable to load the shaft against the stop with a force adequate to prevent substantial axial growth of the shaft during subsequent expansion, and
    means for mechanically expanding the shaft into mechanical interference engagement with all the element openings to secure the elements permanently onto the shaft in said fixed orientation and spacing.

11. Apparatus as in claim 10 wherein said locating means include locators recessed to receive and support the elements in desired orientations and spacers between the locators to longitudinally separate and locate the elements, the locators for certain elements further including adjustable locator means in the recesses and engageable with said certain elements to accurately adjust the desired angular location thereof.

12. Apparatus as in claim 11 wherein said locating means further include biasing devices engageable with said certain elements to urge them against their respective adjustable locator means.

13. Apparatus as in claim 12 wherein the biasing devices comprise resiliently urged guide pins and said pins incorporate ends having stepped surfaces cooperating with adjacent surfaces of the apparatus to act as flush pin gages indicating the condition of elements loaded into the apparatus.

14. Apparatus as in claim 10 wherein the force applying means includes a hydraulic actuator for transmitting the applied force.

15. Apparatus as in claim 14 wherein the force applying means further includes a hardened hollow bushing engageable with said shaft opposite end and carried in a movable backup block for transmitting to the shaft forces applied by the hydraulic actuator.

16. Apparatus as in claim 10 wherein the force applying means includes a mechanical actuator for transmitting the applied force.

17. Apparatus as in claim 16 wherein the force applying means comprises a screw actuator.

18. Apparatus as in claim 17 wherein the force applying means further includes a hardened hollow bushing engageable with said shaft opposite end and carried in a movable backup block for transmitting to the shaft forces applied by the screw actuator.

* * * * *